Jan. 11, 1949.  G. W. HARRIS ET AL  2,458,590
COMBINATION AUTOMOBILE JACK
AND ENGINE STARTING DEVICE
Filed April 19, 1946  2 Sheets-Sheet 2
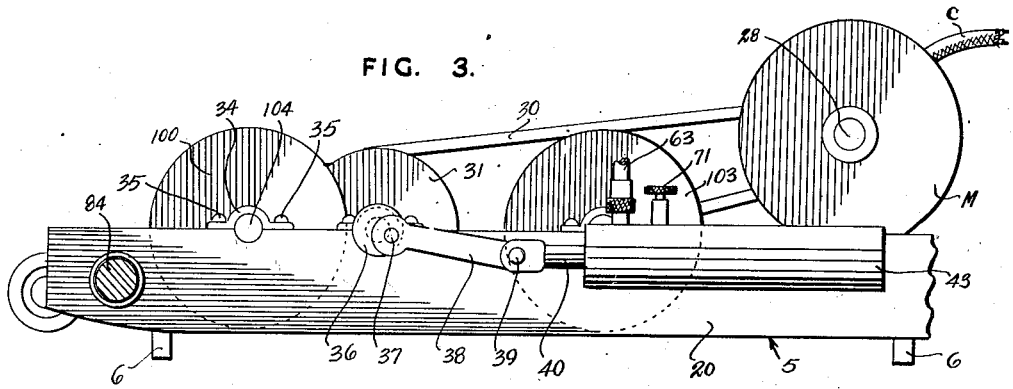
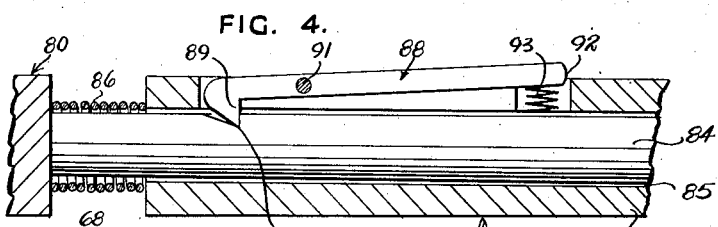
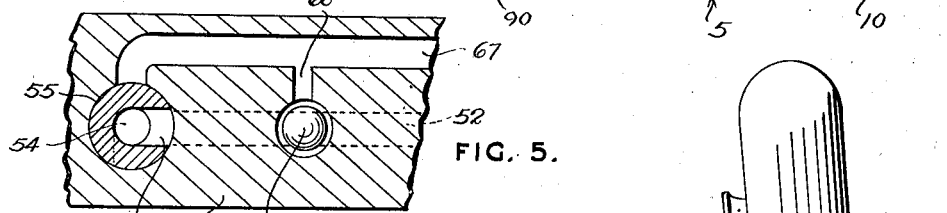
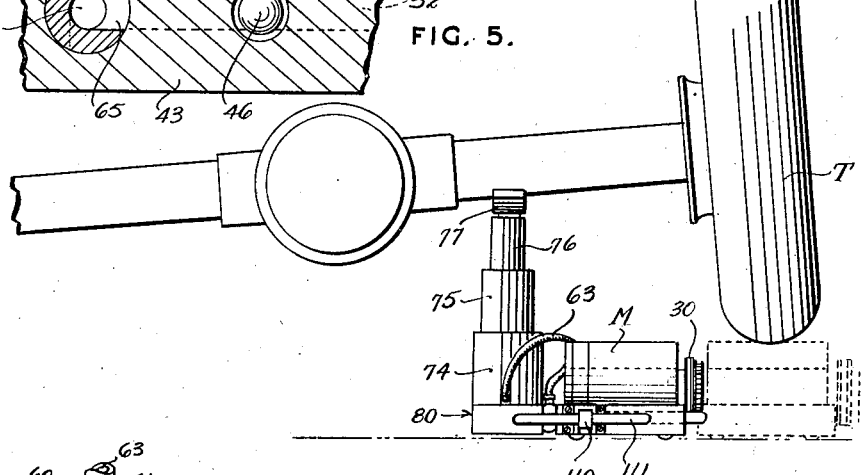
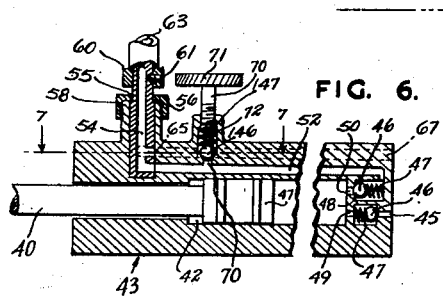
Inventor
GEORGE W. HARRIS, AND
HUGH H. HANSHAW,
Attorneys Patented Jan. 11, 1949

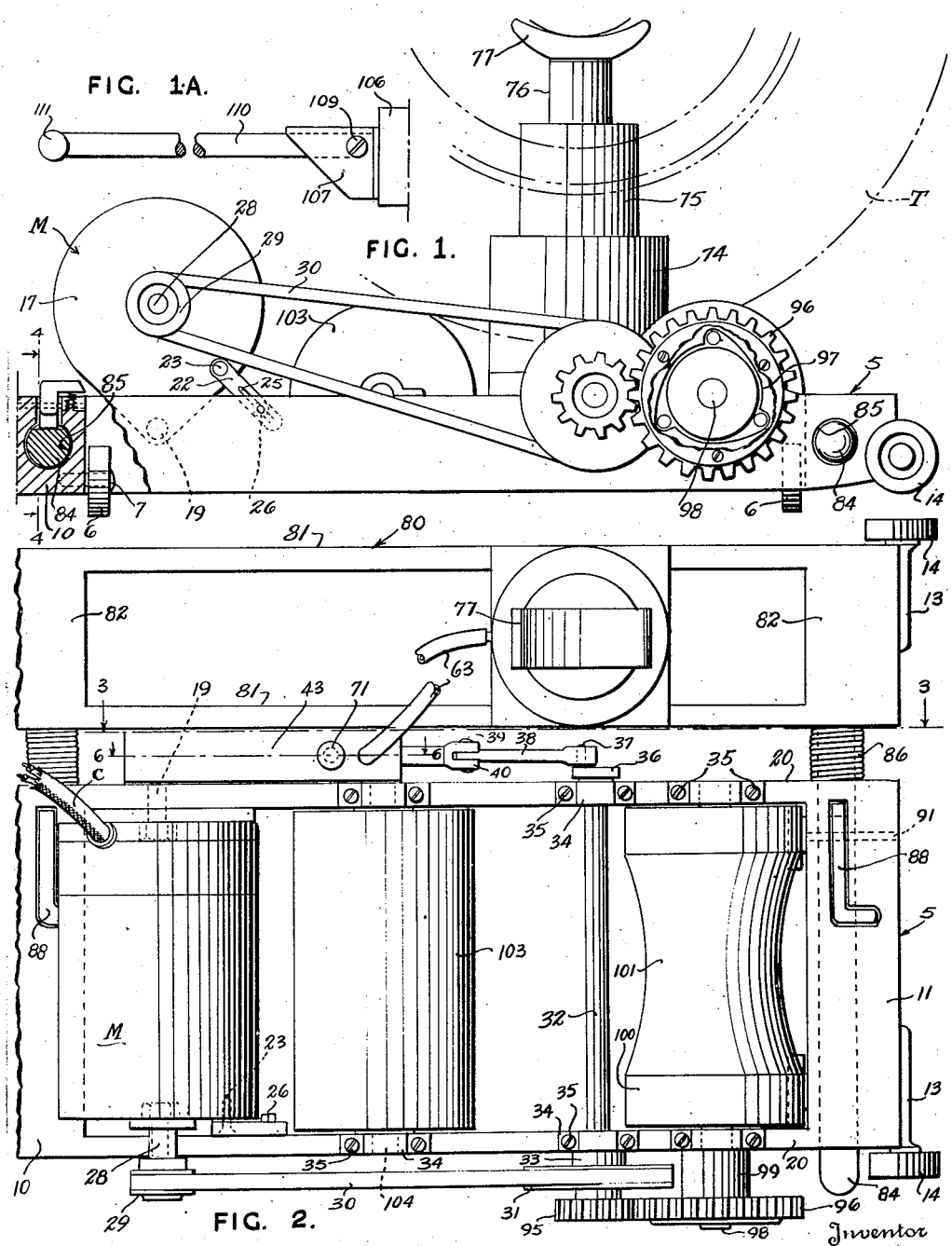

2,458,590

UNITED STATES PATENT OFFICE 2,458,590

COMBINATION AUTOMOBILE JACK AND ENGINE STARTING DEVICE

George W. Harris, Ransomville, N. C., and Hugh H. Hanshaw, Norfolk, Va.

Application April 19, 1946, Serial No. 663,488

4 Claims. (Cl. 74—14)

1

This instant application relates to a combination automobile jack and engine starting device.

The main object of the invention is to provide an apparatus including a motor and jack operated thereby for lifting a motor vehicle and also including means operated by said motor for starting the engine of said vehicle.

A more specific object of the invention is to provide an apparatus of the class characterized and comprising a stationary or base frame and a frame slidably mounted on and to one side of the base frame. The entire structure is placed beneath the rear axle of a motor vehicle and said axle is lifted by a jack mounted on the base frame and operated from the second frame. The latter includes a roller drive for the rear wheel of a motor vehicle and driven by a motor also driving the jack and after one of the rear wheels is raised, is moved beneath the latter to afterward lower the same upon the roller drive.

Another object of the invention is to provide an apparatus of the class characterized and of simple, enduring and economical construction and operation.

With these and other objects in view the invention resides in the novelty of construction, combination and arrangement of elements specifically hereinafter described and distinctly claimed in the appended claims.

For a better understanding the following description refers to the accompanying drawings forming part of the application and wherein:

Figure 1 is a side elevation partly in section of the preferred embodiment of my invention.

Figure 1a is a detail view of a handle and bracket attached to the rear side of my apparatus;

Figure 2 is a top plan view;

Figure 3 is a sectional elevation on line 3—3 of Figure 1.

Figure 4 is an enlarged diametral detail section partly in elevation on line 4—4 of Figure 1.

Figure 5 is a fragmentary rear end view of a motor vehicle and of my apparatus placed beneath the rear axle thereof.

Figure 6 is an enlarged fragmentary detail section on line 6—6 of Figure 2.

Figure 7 is a still more enlarged detail section on line 7—7 of Figure 6.

In the drawings, in which like characters of reference designate like or similar parts, numeral 5 denotes a substantially rectangular and normally horizontally disposed frame which is supported on a suitable surface such as the floor of a garage by four rollers 6 each journaled on a stub axle 7. A pair of such axles are affixed with

2 their inner ends and in spaced relation to the inner side of the rear member 10 of the frame and another pair of axles (not shown) is similarly affixed to the inner side of the front member 11 of the frame 5 (Figures 1, 3).

To the forward side of the front member and near the outer end thereof is attached, by welding or otherwise, an axle 13 which extends beyond the outer side of the frame and carries a roller 14. When the frame rests on rollers 6, the roller 14 is above the ground.

An electric motor M which receives current by a conductor C, has a substantially cylindrical housing including end plates 17 having substantially triangular aligned ears whereby the motor is pivoted for adjustment on a pair of bolts 19 affixed to the inner sides of the side member 20 of the frame. The bolts when tightened hold the motor in a predetermined position and are aided in their function by a link 22 which is pivoted at one end on a bolt 23 threaded into the outer side of the motor and provided with a slot 25 in the opposite end portion. A bolt 26 passes through the slot and may be screwed into the outer side member 20 to hold the motor in a predetermined position.

The outer end of the motor shaft 28 carries a pulley 29 over which an endless, forwardly extending, belt 20 is trained. The belt 30 is also trained over a larger pulley 31 rigid upon a shaft 32 and spaced from the outer side of the outer side member of the frame by a collar 33 rigid with shaft 32.

Shaft 32 is journaled at both ends in the upper portions of the side members 20 and caps 34 affixed thereto by bolts 35 and carries upon the end projecting beyond the inner side member 20 an eccentric 36 to which by a pin 37 one end of a connecting rod 38 is pivoted. The other end of connecting rod 38 is pivoted by a pin 39 in the bifurcated end of a piston rod 40 having at its other end a piston 41 (see Fig. 6).

The piston is slidable in a cylindrical recess 42 of a pump barrel 43 horizontally disposed and supported by inner side member 20 at the outer side thereof. The right-hand (Figures 3, 6) end of the barrel has an inlet port 45, sometimes closed by a ball 46 urged by a spring 47 which bears with its inner end against a partition 48 having an aperture 49 aligned with port 45.

The partition also has an outlet opening 50 at times closed by a ball 46 urged by spring 47. The outlet valve cage bounded by the partition and other walls of the barrel communicates with a conduit 52 extending inwardly of the barrel and parallel to the axis thereof. The rear end of conduit 52 communicates with the wider, inner flaring end of the lower horizontal leg of a passage 54 formed in a substantially cylindrical relief valve body 55 which is mounted in the pump barrel and a radially extending cylindrical flange 56 and is rotatable about its own longitudinal axis coinciding with the flange axis extending radially from the axis of the barrel. A stuffing box 58 has interior threads screwed upon the flange 56 and effectively seals the joint between the latter and the valve body 55 (Figure 6). A handle ring 60 is secured above the stuffing box upon the valve body by set screw 61 and may turn the body which is rotatably or fixedly connected to a flexible tube 63. The axial leg of the passage 54 has a horizontal radial branch 65 opening through the valve body and in vertical alignment with a portion of the lower flaring horizontal leg of the passage (Figure 7). After the valve body has been turned a quarter turn counter-clockwise from the position shown in Fig. 7, branch 65 registers with the inner end of a conduit 67 the outer end of which communicates with the atmosphere. From an intermediate part of conduit 67 branches off a passage 68 which also communicates with a valve cage for a ball 146 urged by spring 147 to a position in which the former closes a port 70 also in communication with the passage 52. The spring 147 in the valve cage may be compressed by the inner end of a screw 70' including a knurled hand wheel 71 and received into a cylindrical flange 72 formed upon the barrel and extending radially from the main body thereof. (Figures 6, 7). The structure just described is a pressure-responsive or automatic relief valve.

The other end of the tube 63 communicates with the lowermost and largest cylinder section 74 of a pneumatic jack also including an intermediate section 75 slidable in section 74 and slidably receiving a plunger 76 having an axle receiving member 77 at its upper end.

The section 74 is supported on the intermediate part of a substantially rectangular base frame 80 having side members 81 and front and rear members 82 (Figure 2). The front member carries at its outer end an axle 13 and roller 14 journaled thereon and aligned respectively with the axle 13 and roller 14 on frame 5.

From the inner ends of the front and rear frame members 82 extend outwardly a pair of parallel guide plungers 84 which are slidable in bores 85 formed in the front and rear members of frame 5. The inner ends of the guide plungers are each surrounded by a coil spring 86 which bears with its outer end against the inner side member 20 of frame 5. In order to hold the plungers 84 in their bores with the springs 86 compressed, a pair of latch levers 88 are provided each of which has at one end a hook 89 adapted to hook into a notch 90 in a plunger. Each lever is fulcrumed intermediate its ends upon a pin 91 bridging a slot 92 in the front or rear member of frame 5. The opposite ends of the latch levers are each forced upward by a spring 93 reacting against the front or rear frame members (Figure 4).

The pulley shaft 32 carries upon its outer end and outwardly of the pulley 31 a pinion 95 in mesh with gear 96 connected by an over-running or one-way clutch 97 to its shaft 98 journaled in the frame side members 20 and caps 34 affixed thereto by bolts 35. Clockwise rotation of pinion 95 rotates gear 96 counterclockwise, but the gear cannot rotate the pinion in the same direction because of the direction of the one-way clutch.

The shaft 98 carries a collar 99 spacing the gear 96 from the outer side member 20 and within frame 5 a roller 100 having an intermediate groove 101 conforming to the contour of the rear tire T of a motor vehicle. When such tire rests in the rear portion of the groove it clears the pulley shaft 32 and is supported by a roller 103 on shaft 104 journaled in the side members 20 and caps 34 affixed thereto by bolts 35.

Figure 1a shows a plate 106 which is attached on its front side to the intermediate part of the rear side of the rear member 10 of frame 5 and carries on its rear side a triangular slotted bracket 107 which is closed at the top and open on its lower beveled side. A horizontal pin 109 is mounted in the bracket and functions as a fulcrum for the handle 110 having a transverse grip 111.

In inoperative condition the apparatus hereinbefore described is in the collapsed or knockdown position of Figure 2 in which the latch levers hold the guide plungers in their bores.

To place the apparatus in operating position the operator swings the handle 110, 111 upwardly and tilts the apparatus forwardly about the forward edges of the front rollers 6 until the rollers 14 touch the floor on which the apparatus is then wheeled forwardly beneath the rear end of a motor vehicle and tilted rearwardly to occupy an operating position. In the latter the load support of the jack is aligned with the rear axle.

The electric motor whose position has been adjusted to sufficiently tighten the belt is started and operates the air pump which furnishes compressed air to the jack.

The load support of the latter rises and lifts the right-hand end of the rear axle and rear wheel attached thereto. The pressure within the jack is limited by the adjustable pressure-responsive relief valve 67, 68, 70 and its stroke may be limited by turning of the valve body 55, to a position in which the branch 65 registers with the inner end of passage 68 with the result that the jack collapses. Prior to the manipulation of the valve body the spring-loaded ends of the latch levers are depressed with the result that the springs 86 push the frame 5 beneath the raised rear wheel. The same is lowered by the collapsing of the jack upon the rollers 100 and 103. The roller 100 is rotated by the motor and rotates the rear vehicle wheel which rotates the roller 103. Thus the engine may be operated to the extent desired. The rear vehicle wheel, however, cannot drive the gear 96, pinion 95 and motor shaft 28 and hence is free to rotate on rollers 100 and 103 under power of the vehicle engine.

Various changes in the details of construction and arrangement of parts may be made without departing from the principle and scope of the invention as defined in the following claims.

We claim:

1. In a combined automobile jack and wheel-driving device, a base frame, a jack mounted on said base frame and extensible upwardly therefrom, a second frame, guide means carried by said base frame and slidably engaging said second frame to provide freedom of movement of said second frame toward and away from said base frame in a predetermined, relative direction, means operatively associated with said guide means controlling movement of said second frame relative to said base frame, a pair of spaced-apart wheel-driving rollers journaled on said second frame, an electric motor mounted on said second frame, and means drivingly connecting said motor with said rollers and said jack, operative to render said motor effective to drive said jack independently of said rollers.

2. In a combined vehicle jack and wheel-driving device, a base frame, a jack mounted on said base frame and extensible upwardly therefrom, a second frame, guide means carried by said base frame and slidably engaging said second frame to provide freedom of movement of said second frame toward and away from said base frame in a predetermined, relative direction, means operatively associated with said guide means controlling movement of said second frame relative to said base frame, a pair of spaced-apart wheel-driving rollers journaled on said second frame, an electric motor mounted on said second frame, means drivingly connecting said motor with said rollers and said jack, operative to render said motor effective to drive said jack independently of said rollers, said guide means comprising a pair of spaced-apart plungers mounted on said base frame and slidably received in respective bores in said second frame, each of said plungers having a notch therein, and means controlling movement of said second frame relative to said base frame comprising respective coiled compression springs surrounding said plungers between said frames for projecting said rollers under a vehicle wheel after the wheel has been elevated by said jack, and a pair of latches pivotally secured to said second frame and releasably engageable respectively in said notches in said guide plungers.

3. In a combined automobile jack and wheel-driving device, a base frame, a jack mounted on said base frame and extensible upwardly therefrom, a second frame, guide means carried by said base frame and slidably engaging said second frame to provide freedom of movement of said second frame toward and away from said base frame in a predetermined, relative direction, means operatively associated with said guide means controlling movement of said second frame relative to said base frame, a pair of spaced-apart wheel-driving rollers journaled on said second frame, an electric motor mounted on said second frame, means drivingly connecting said motor with said rollers and said jack, operative to render said motor effective to drive said jack independently of said rollers, said means drivingly connecting said electric motor with said wheel-driving rollers comprising, a shaft journaled on said second frame adjacent to one of said rollers, a gear and a belt pulley on said shaft, a belt connecting said shaft with said motor, a gear on said one roller meshing with said shaft gear, and a one-way clutch between said roller gear and said one roller.

4. In a combined automobile jack and wheel-driving device, a base frame, a second frame, guide means carried by said base frame and slidably engaging said second frame to provide freedom of movement of said second frame toward and away from said base frame in a predetermined, relative direction, a fluid-operated jack carried by said base frame and extensible upwardly therefrom, a pair of wheel-driving rollers journaled on said second frame, an electric motor mounted on said second frame, and means drivingly connecting said motor with one of said rollers and said jack comprising a shaft journaled on said second frame, means drivingly connecting said motor with said shaft, a gear on said shaft, a gear on said one roller meshing with said shaft gear, a one-way clutch between said roller gear and said one roller, a fluid pump mounted on said second frame and operatively connected with said shaft, a connection between said pump and said jack including a flexible tube, and a jack-controlling valve in said connection.

GEORGE W. HARRIS.
HUGH H. HANSHAW.

REFERENCES CITED

The following references are of record in the file of this patent:

UNITED STATES PATENTS

| Number | Name | Date |
|---|---|---|
| 1,646,759 | McCall | Oct. 25, 1927 |
| 2,049,315 | Patterson | July 28, 1936 |
| 2,247,629 | Chioppetti | July 1, 1941 |
| 2,271,586 | Gerich | Feb. 3, 1942 |